INVENTOR.
RAYMOND H. PFREHM,
BY
ATTORNEY.

United States Patent Office 3,488,996
Patented Jan. 13, 1970

3,488,996
DETERMINATION OF OIL IN A
FLOWING STREAM
Raymond H. Pfrehm, Houston, Tex., assignor to Esso
Research and Engineering Company
Filed Sept. 7, 1967, Ser. No. 666,080
Int. Cl. G01n 11/00; G01f 1/00
U.S. Cl. 73—61.1                                    6 Claims

ABSTRACT OF THE DISCLOSURE

The oil content of a flowing stream of oil and water is determined by measuring during a test period the total volume of liquid, total mass of liquid and the specific gravity of both the oil and the water separately at operating temperature. Then by substituting the proper values in the following equation the percentage of oil is obtained:

Percent oil =

$$\frac{\left(\text{Sp. gr. water} - \dfrac{\text{Total mass}}{\text{Total mass (100\% water)}}\right)}{\text{Sp. gr. water} - \text{sp. gr. oil}} \times 100$$

This is particularly useful in testing wells where water is produced and allows measurement of mass or volume as well as determination of amount of water and oil.

BACKGROUND OF THE INVENTION

Field of the invention

The present invention is directed to the determination of oil and/or water in a flowing stream containing a mixture thereof. More particularly, the invention is concerned with determination of relative amounts of immiscible liquids in a flowing stream of same. In its more specific aspects, the invention relates to determination of mass flow or volume and the determination of amounts of two immiscible liquids such as oil and water in a flowing stream over a selected period of time.

Description of prior art

It is known to obtain mass flow of a fluid flowing through a conduit using a combination of turbine and orifice meters. It is also known to obtain the volume of a liquid flowing through a conduit. Heretofore, it has been the practice in determining the amounts of oil and water produced from a well to flow the mixture into a tank and allow the two liquids to separate by gravity and the amounts of each determined by separate measurement. All of these methods taken alone are cumbersome and time consuming. However, if a turbine meter is employed to measure volume by itself as well as mass flow in conjunction with an orifice meter and computer means, the relative amounts of oil and water may be obtained in one operation.

Prior art considered in relationship to the present invention is as follows: U.S. Patent 2,772,567.

SUMMARY

The present invention may be briefly tescribed and summarized as involving the continuous measurement over a selected period of time of the total volume of a mixture of two immiscible liquids such as oil and water while at the same time measuring the total mass of the mixture. The specific gravity of each of the liquids is obtained and the amount of one of the liquids is calculated, usually the lightest from the following equation:

Percent lightest liquid =

$$\frac{\left(\text{Sp. gr. of heaviest liquid} - \dfrac{\text{Total mass of liquid}}{\text{Total mass (100\% heaviest liq.)}}\right)}{\text{Sp. gr. of heaviest liquid} - \text{sp. gr. of lightest liquid}} \times 100$$

In the case of oil and water, oil is the lightest liquid and water is the heaviest liquid.

The total volume may be obtained with a turbine meter while the total mass may be obtained with a combination of turbine and orifice meters and computer means.

BRIEF DESCRIPTION OF THE DRAWING

The present invention will be further illustrated by reference to the drawing in which.

DESCRIPTION OF THE PREFERRED EMBODIMENTS IN CONJUNCTION WITH THE DRAWING

Figure 1:
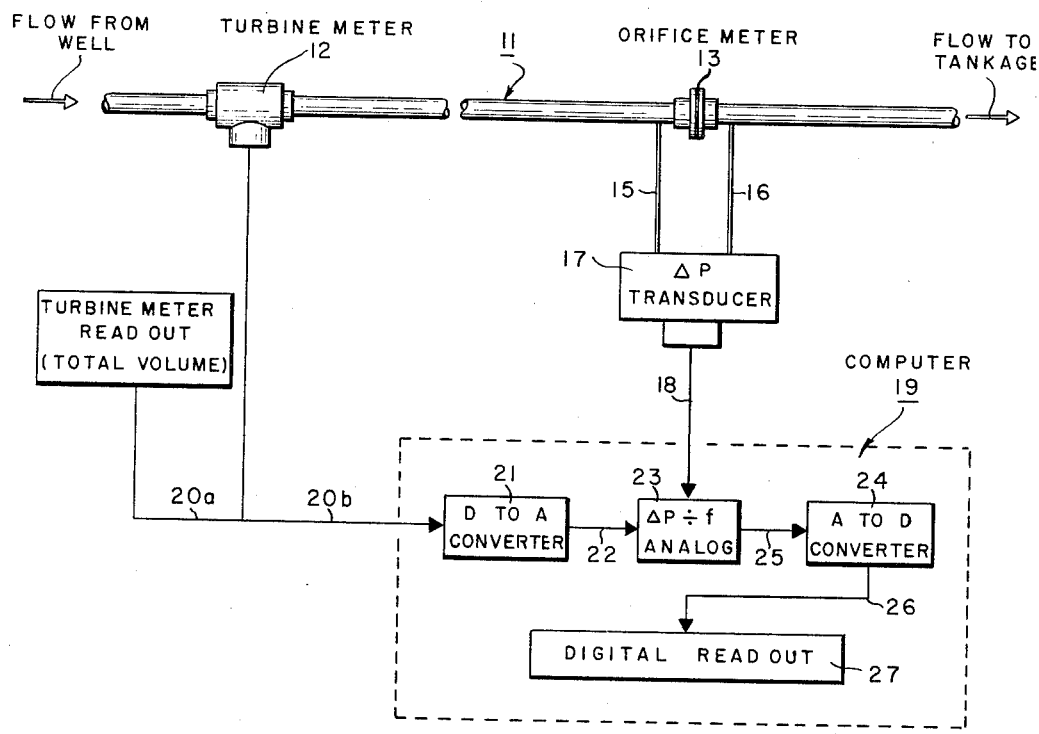
FIGURES 1 and 1A are schematic illustrations of the present invention.
Figure 1A:
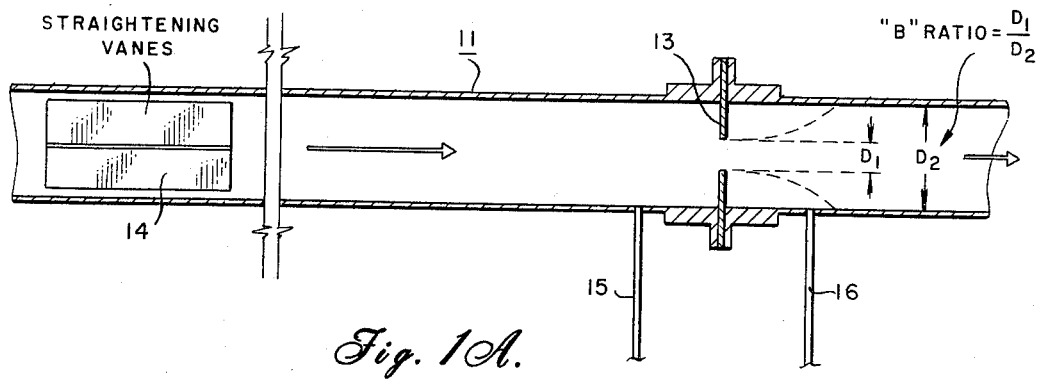

Referring now to the drawing which illustrates a best mode and embodiment and particularly to FIGURES 1 and 1A, numeral 11 designates a conduit such as a pipeline connected to a flowing well not shown from which oil and water are being produced to tankage not shown. A turbine meter 12 sized to provide a velocity range therethrough from about 5 to about 25 f.p.s. which is spaced upstream from orifice meter 13 in pipeline 11 a distance at least 10 to 20 diameters of pipeline 11 dependent on whether or not straightening vanes such as 14 are arranged between turbine meter 12 and orifice meter 13. If straightening vanes 14 are employed, the distance may be at least 10 diameters. If vanes 14 are dispensed with the distance must be at least 20 diameters.

Orifice meter 13 connects by pressure conducting conduits 15 and 16 to a differential pressure transducer 17 which in turn connects by electrical connection means 18 to a computer means 19 indicated by a dashed rectangle. Turbine meter 12 connects to computer means 19 by electrical connection means 20a to a turbine meter readout means which registers total volume and by electrical connection means 20b which feeds the digital output in the form of an electrical impulse or signal from turbine meter 12 to an analog converter 21 in computer means 19 which converts the digital output to an analog function. This latter signal is fed by electrical connection means 22 to means 23 into which the analog function of transducer 17 is fed by electrical connection means 18. Means 23 divides the analog function of the differential pressure transducer (orifice meter) by the analog function of the turbine meter and obtains a quotient which is proportional to mass flow rate. This quotient, in the form of a signal or electrical impulse, feeds into converter means 24 by electrical connection means 25 and is converted from an analog function to a digital output of computer means 19 which feeds by electrical connection means 26 into computer read-out 27 which registers total pounds throughput through conduit or pipeline 11.

The mass flow function of the present invention may be demonstrated mathematically by the following expression:

$$\frac{\Delta P}{f} = \frac{C_1 V^2 \gamma}{CV} = KV\gamma = \text{mass flow rate}$$

where:

V=velocity of flowing stream
γ=density of flowing stream
K=constant

With the total volume of liquids flowing through pipeline 11 such as a mixture of oil and water indicated by the turbine meter 12 and the total mass obtained by the computer 19, the percentage or volume of oil and water flowing through pipeline 11 from a well to tankage may be determined from the following equation:

$$\text{Percent oil} = \frac{\left(\text{Sp. gr. of water} - \dfrac{\text{Total mass}}{\text{Total mass (100\% water)}}\right) \times 100}{\text{Sp. gr. water} - \text{Sp. gr. oil}}$$

As a specific example, if the measured total volume of a liquid composed of oil and water is 1000 barrels flowing through pipeline 11 and the total measured mass is 255,000 pounds with water having a sp. gravity of 1 and the oil separated therefrom having a specific gravity of 0.7 and the weight standard of water is about 350 pounds per barrel, then:

$$\text{Percent oil} = \frac{1 - \dfrac{255{,}000}{350{,}000}}{1 - 0.7} \times 100 =$$

$$\frac{1 - 0.73}{1 - 0.7} \times 100 = \frac{0.27}{0.3} \times 100 = 90\%$$

Hence, the liquid in pipeline 11 is 90% by weight oil and 10% by weight water.

The invention has application to measurement of oil and water mixtures such as mixtures containing from about 20% to about 40% by volume of water and from 80% to about 60% oil. The oil or hydrocarbon may be crude or synthetic petroleum or fractions thereof such as those boiling in the range from liquefied petroleum gas to heavy residues. Particularly, fractions boiling in the gasoline, kerosene, gas oil and lubricating oil range may be used. Other immiscible fluids such as liquid hydrocarbons from coal and oil shale and the like and hydrocarbon derivatives immiscible in fresh or salt water (brines) may be used. Particularly, the invention is useful in measuring oil and water produced from oil and gas wells. Other immiscible fluids flowing through a conduit may be measured besides those exemplified and the invention is not limited thereto.

The period over which the volume and mass may be measured may range from about 10 minutes to about 48 hours, although greater times may be used. For oil wells, particularly those flowing from offshore, measurement may be over a period of 24 hours, although lesser or greater times may be used.

The nature and objects of the present invention having been completely described and illustrated and the best mode and embodiment contemplated set forth what I wish to claim as new and useful and secure by Letters Patent is:

1. A method of determining the amount of a lightest liquid in a mixture of two immiscible liquids of different densities flowing through a conduit during a selected period of time which comprises:
   (a) continuously flowing said liquids through a volume meter and thereby measuring the total volume of said liquids flowing through said conduit;
   (b) continuously flowing said liquids through a mass flow meter comprising said volume meter and thereby measuring the total mass of said liquids flowing through said conduit;
   (c) separating a portion of said mixture to obtain said separated immiscible liquids and separately obtaining the specific gravity of said immiscible liquids flowing through said conduit; and
   (d) thereby obtaining the amount of the lightest one of said liquids by inserting values corresponding to the total masses of liquid, heaviest liquid, and specific gravities into and from the following equation:

$$\text{Percent lighest liquid} = \frac{\left(\begin{array}{c}\text{Sp. gr. of} \\ \text{heaviest liquid}\end{array} - \dfrac{\text{Total mass of liquid}}{\text{Total mass (100\% heaviest liquid)}}\right)}{\text{Sp. gr. of heaviest liquid} - \text{Sp. gr. of lightest liquid}} \times 100$$

2. A method in accordance with claim 1 in which the lightest liquid is liquid hydrocarbon and the heaviest liquid is water.

3. A method in accordance with claim 2 in which the mixture contains about 20% to about 40% by volume of water and about 80% to 60% by volume of hydrocarbon.

4. A method in accordance with claim 1 in which the lightest liquid is oil and the heaviest liquid is water.

5. A method in accordance with claim 4 in which the water is brine.

6. A method in accordance with claim 4 in which the water is fresh water.

References Cited

UNITED STATES PATENTS

| | | | |
|---|---|---|---|
| 2,571,470 | 10/1951 | Milligan | 73—61.1 |
| 2,772,567 | 12/1956 | Boden et al. | 73—231 |
| 3,006,189 | 10/1961 | Warren et al. | |
| 3,012,436 | 12/1961 | Meyers | 73—194 |
| 3,014,362 | 12/1961 | True et al. | 73—61.1 |
| 3,081,636 | 3/1963 | Hubby | |
| 3,277,710 | 10/1966 | Ball | 73—233 |
| 3,304,766 | 2/1967 | Hubby | 73—61.1 |
| 3,365,945 | 1/1968 | Parks | 73—61.1 X |
| 3,385,108 | 5/1968 | Rosso | 73—61.1 X |

LOUIS R. PRINCE, Primary Examiner

J. W. ROSKOS, Assistant Examiner

U.S. Cl. X.R.

73—194